(12) United States Patent
Lee et al.

(10) Patent No.: US 6,404,712 B1
(45) Date of Patent: Jun. 11, 2002

(54) METHOD AND APPARATUS FOR OPTIMALLY RECORDING INFORMATION ON AN OPTICAL RECORDING MEDIUM

(75) Inventors: Seong-Ju Lee; Dong-Seok Bae, both of Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/377,814

(22) Filed: Aug. 20, 1999

(30) Foreign Application Priority Data

Aug. 21, 1998 (KR) .............................. 98-34336

(51) Int. Cl.[7] .................................. G11B 7/00
(52) U.S. Cl. .................. 369/47.53; 369/59.11
(58) Field of Search .............................. 369/47.1, 47.11, 369/47.12, 53.11, 53.2, 53.25, 53.26, 53.27, 53.37, 53.44, 59.1, 116, 59.11, 47.5, 47.51, 47.52, 47.53, 53.1

(56) References Cited

U.S. PATENT DOCUMENTS 5,737,301 A * 4/1998 Miyamoto et al. .......... 369/116
5,889,742 A * 3/1999 Kuroda .................... 369/59.26

* cited by examiner

*Primary Examiner*—Muhammad Edun
(74) *Attorney, Agent, or Firm*—Birch, Stewart, Kolasch & Birch, LLP

(57) ABSTRACT

When an optical disk is inserted, a writing power which is optimal for the optical disk is detected from recording and reproduction of test data and the value of the detected optimal writing power is recorded in a specific area of the optical disk. When recording data on the optical disk a next time, the recorded optimal writing power is used, therefore unnecessary repetition of the procedure for yielding an optimal writing power can be prevented. The method for recording information on an optical disk according to the present invention comprises the steps of (1) reading the reference writing power recorded on the optical disk, (2) recording test data on the optical disk by changing the writing power within a range with respect to the reference writing power, (3) reproducing the test data recorded on the recording medium and detecting an optimal writing power from a property of the reproduced signal, and (4) recording the information indicative of whether the steps (1) through (3) should be conducted in a predetermined area of the optical disk. The present invention eliminates unnecessary delays in data recording and reduces data playback errors caused by the use of an inappropriate writing power.

16 Claims, 6 Drawing Sheets

FIGURES

*Conventional Art*

Conventional Art

*Conventional Art*

METHOD AND APPARATUS FOR OPTIMALLY RECORDING INFORMATION ON AN OPTICAL RECORDING MEDIUM

BACKGROUND OF THE INVENTION

1. Field of the Invention

The present invention relates to a method and apparatus for recording information on an optical recording medium, and more particularly, but not by way of limitation, to a method and apparatus for recording information on an optical recording medium, which detects an optimal writing power for recording data on the optical recording medium and records information using the detected optimal writing power.

2. Description of the Related Art

FIG. 1 is a simplified block diagram of an apparatus for recording/reproducing data on/from an optical disk. The apparatus comprises an A/D converter 20 for digitizing analog signals, an MPEG encoder 30 for encoding the digitized data in the MPEG format, a digital recording signal processing unit 70a for converting the MPEG-formatted data into recording-formatted data by adding error correction codes, channel bit encoder 80 for converting the recording-formatted data into a bit stream, an optical driver 81 for yielding signals to drive an optical source, a pickup 11 for recording signals on optical disk 10 and reproducing recorded signals from optical disk 10, a driver unit 90 for driving pickup 11 and a motor M, an R/F unit 100 for equalizing and shaping the signals reproduced by pickup 11 to produce binary signals, a servo unit 110 for controlling driver unit 90 using tracking and focusing error signals provided by pickup 11 and the rotation velocity of optical disk 10, digital reproduced signal processing unit 70b for retrieving compressed data from the binary signals using a clock synchronized with the binary signals, an MPEG decoder 120 for retrieving original video/audio data by decoding the compressed data, and a microcomputer 60.

Receiving a request for data recording, microcomputer 60 executes an OPC (Optimal Power Calibration) routine, which will be explained below in detail.

Before recording data, microcomputer 60 controls pickup 11 through servo unit 110 and driver unit 90 to read the indicative target writing power (Pind) recorded on recording medium 10. In the case where disk 10 is a rewritable recording medium such as CD-RW, the target writing power is recorded as 3-bit data (W1,W2,W3) in the M1 information byte in the field of ATIP (Absolute Time In Pre-Groove) located in the lead-in area of optical disk 10, as shown in FIG. 2.

After reading the target writing power, microcomputer 60 transfers its own test data to channel bit encoder 80 via digital recording signal processing unit 70a. For recording the digital bit stream outputted from digital recording signal processing unit 70a, channel bit encoder 80 convert the bit stream into pulse-width-modulated signal and transfers the modulated signal to optical driver 81.

Microcomputer 60 applies a power adjustment signal (as shown in FIG. 3) to optical driver 81 for varying the writing power within a given range with respect to the indicative target writing power. In response to the power adjustment signal, optical driver 81 outputs recording signals of the writing power corresponding to the given power adjustment signal so that pickup 11 records the test data in the test area of optical disk 10. In the case where optical disk 10 is a rewritable CD (CD-RW), the test data is recorded in the test area A located in the PCA (Power Calibration Area) shown in FIG. 4, whereas if optical disk 10 is a DVD, the test data is recorded in the drive test zone shown in FIG. 5.

Along with recording the test data on a rewritable disk, microcomputer 60 controls pickup 11 to record the number of tests in the count area B located in the PCA. For example, if recording of the test data is executed three times, null data block is also recorded in the count area B three times (as shown in FIG. 4).

On the condition that the test data is recorded in a specific area of optical disk 10 with varying writing powers, microcomputer 60 reproduces the most recently recorded test data by controlling pickup 11. While reproducing the test data, microcomputer 60 continuously examines the quality of the reproduced signal such as the jitter characteristic for detecting the optimal writing power (Pop in FIG. 3), which shows the reproduced signal having the best quality. The value of the optimal writing power is stored.

If external video or audio data is received for recording after the optimal writing power is obtained, the received data is digitized by A/D converter 20 and encoded in the MPEG format by MPEG encoder 30. Digital recording signal processing unit 70a generates a data bit stream after adding parity for enhancing data recording/reproducing reliability. For recording the digital bit stream, channel bit encoder 80 converts the digital bit stream into pulse-width-modulated signals and applies the modulated signals to optical driver 81.

Microcomputer 60 controls optical driver 80 so that it produces a laser beam of the optimal writing power obtained by the previous procedure. The pulse-width-modulated data is recorded in the program area of optical disk 10 by pickup 11.

The audio or audio data is recorded in the area a (as shown in FIG. 6) with the obtained optimal writing power. If another request for recording data is received, microcomputer 60 repeats the aforementioned steps for recording test data and obtaining an optimal writing power and records the data in the area b (shown in FIG. 6), using the newly obtained optimal writing power.

In the conventional method for recording/reproducing data on an optical disk explained above, the procedure for recording test data and detecting the optimal writing power is repeated whenever a data recording is requested, which takes a relatively long time and delays the data recording operation. Moreover, since the optimal writing power is calculated for each data recording request, the data in each area of the recording medium has been recorded with different writing powers, as shown in FIG. 6. When reproducing the recorded data, however, the gains of R/F unit 100 and servo unit 110 remain fixed. Consequently, though the data is optimally recorded, the recorded data is not reproduced with an optimal writing power, thereby creating data reproduction errors or delays in data playback operations.

SUMMARY OF THE INVENTION

It is an object of the present invention to provide a method and apparatus for optimally recording information on an optical recording medium, which is capable of always recording information with an identical writing power and shortening the recording time by maintaining the information indicative of whether to execute the procedure for detecting the optimal writing power and using the preserved writing power.

The method for optimally recording information on an optical recording medium according to the present invention comprises the steps of reading the reference writing power from the optical recording medium, recording test data on the optical recording medium by changing the writing power within a range with respect to the reference writing power, detecting an optimal writing power from a property of the reproduced signal, and recording the information indicative of the fact that the procedure for detecting the optimal writing power has been conducted in a predetermined area of the optical recording medium.

The other method for optimally recording information on an optical recording medium according to the present invention comprises the steps of checking whether the procedure for detecting the optimal writing power has been executed before by reading the information recorded in a predetermined area of the optical recording medium, reading the value of the optical writing power recorded in the predetermined area based on the checked result, and recording user data on the optical recording medium using the read writing power.

According to the present invention, the reference power recorded in a specific area of the optical recording medium is read, and test data is recorded on the recording medium using writing powers varying within a given range with respect to the reference writing power. After recording the test data, the test data is reproduced, and an optimal writing power is obtained from the quality of the reproduced signal. The information indicative of the fact that the procedure for obtaining the optimal writing power has been conducted and the optimal writing power has been recorded, is written in a specific area of the recording medium.

If an optimal writing power already exists in the specific area of the recording medium, it is assumed that the optimal writing power was written by the recording/reproducing apparatus. If so, user data is recorded in the program area of the optical recording medium using the optimal writing power.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
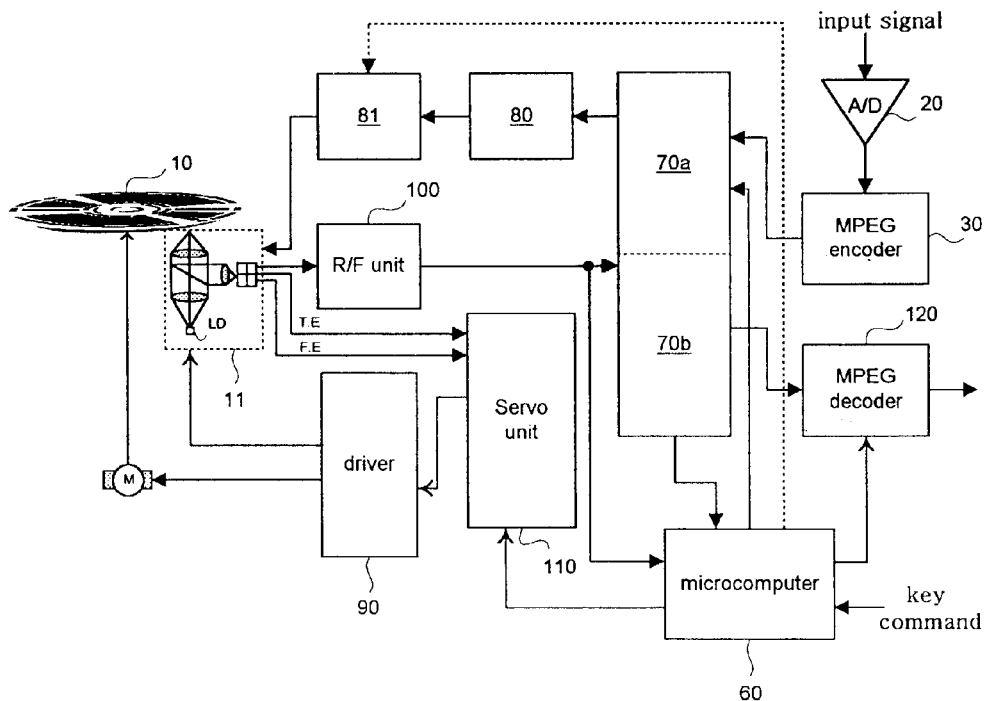
FIG. 1 is a simplified block diagram of a conventional optical information recording/reproducing apparatus.
Figure 7:
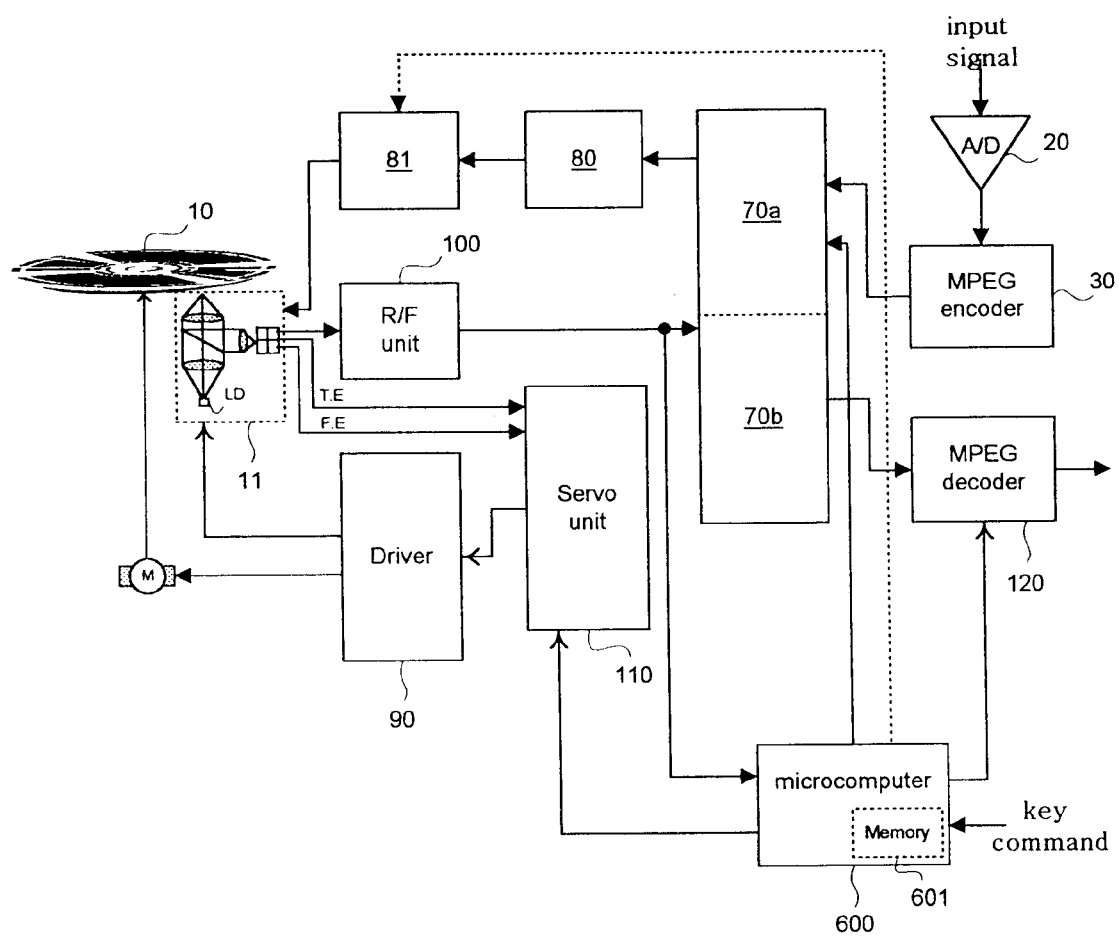
FIG. 7 is a simplified block diagram of an optical information recording/reproducing apparatus embodying the present invention.

FIG. 7 is a block diagram of an optical information recording/reproducing apparatus embodying the present invention. The apparatus is the same as the apparatus shown in FIG. 1, except that microcomputer 600 stores a system code for identifying the apparatus in an internal memory 601 of microcomputer 600, and the apparatus has an additional function for determining whether to use the value of the optimal writing power recorded in the recording medium.

Figure 8:
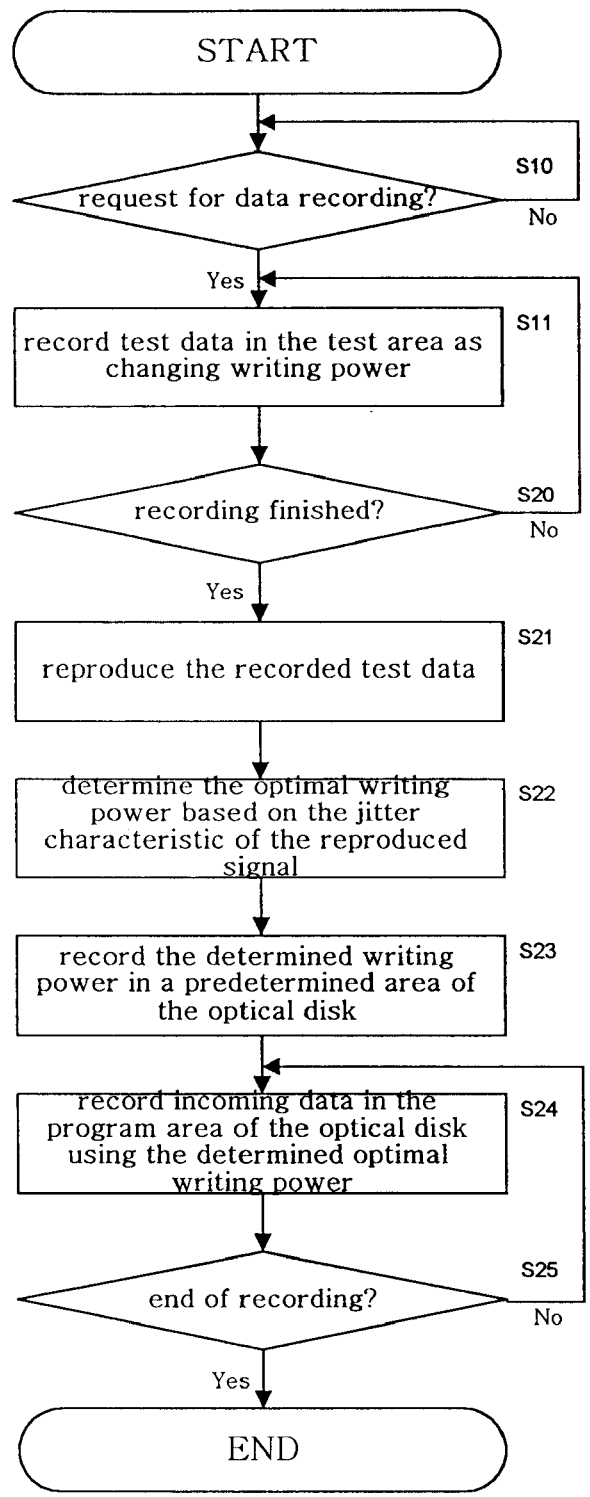
FIG. 8 is a flow diagram of the method for detecting/preserving an optimal writing power in accordance with the present invention.
Figure 9:
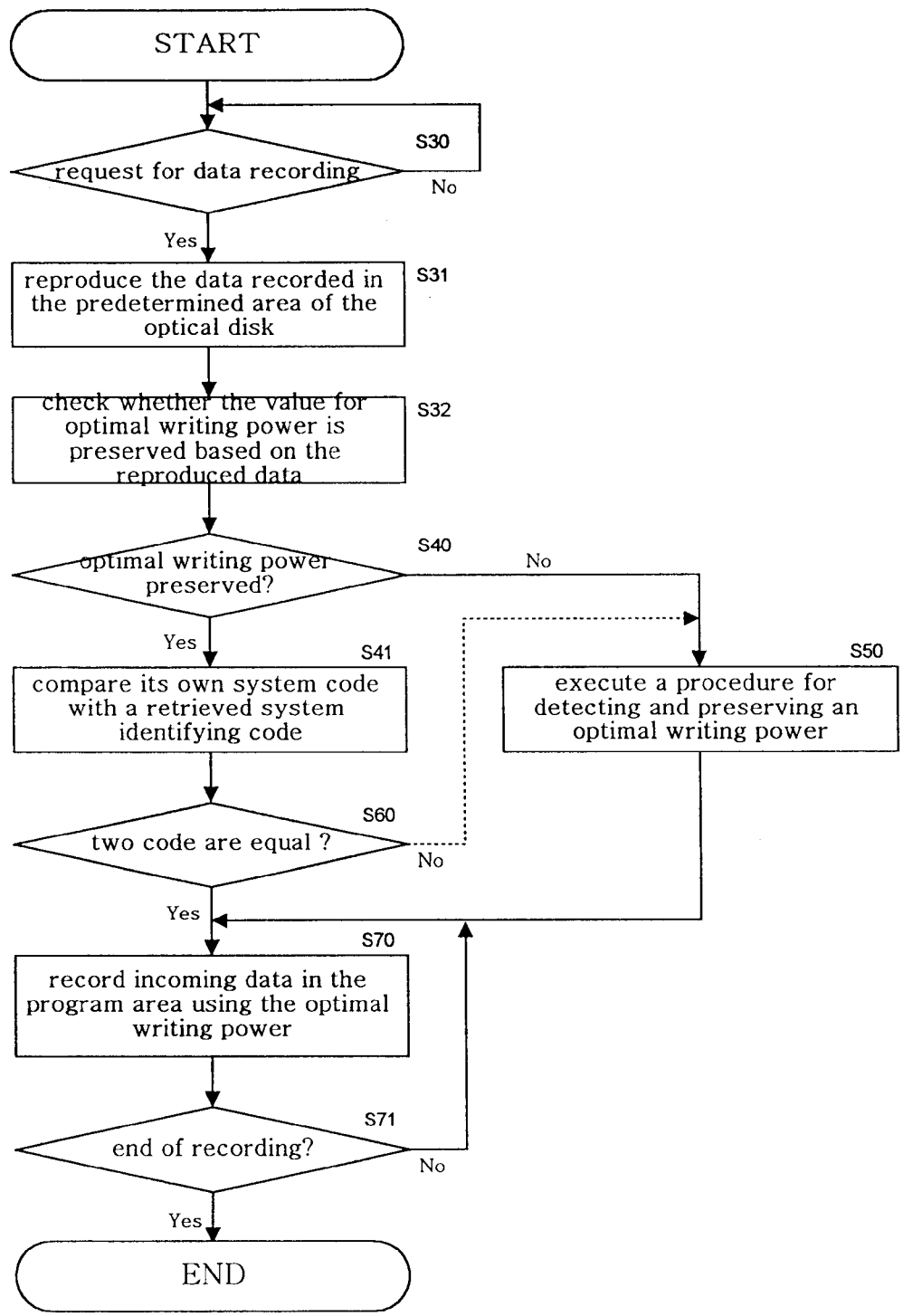
FIG. 9 is a flow diagram of the method for using the optimal writing power recorded on a rewritable recording medium.

FIGS. 8 and 9 are flow diagrams of the method for detecting/preserving an optimal writing power and using the optimal writing power recorded on a rewritable recording medium, respectively. Referring to FIGS. 8 and 9, the method for optimally recording information on an optical disk in accordance with the present invention will be explained in detail.

Figure 4:
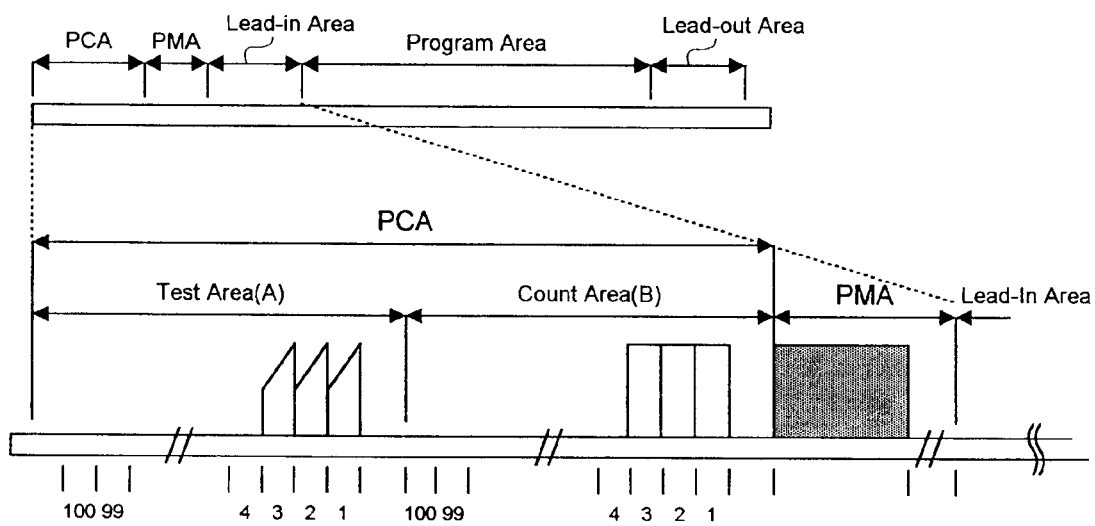
FIG. 4 is a view of the recording signal test area reserved for detecting the optimal writing power for a CD-RW.
Figure 5:
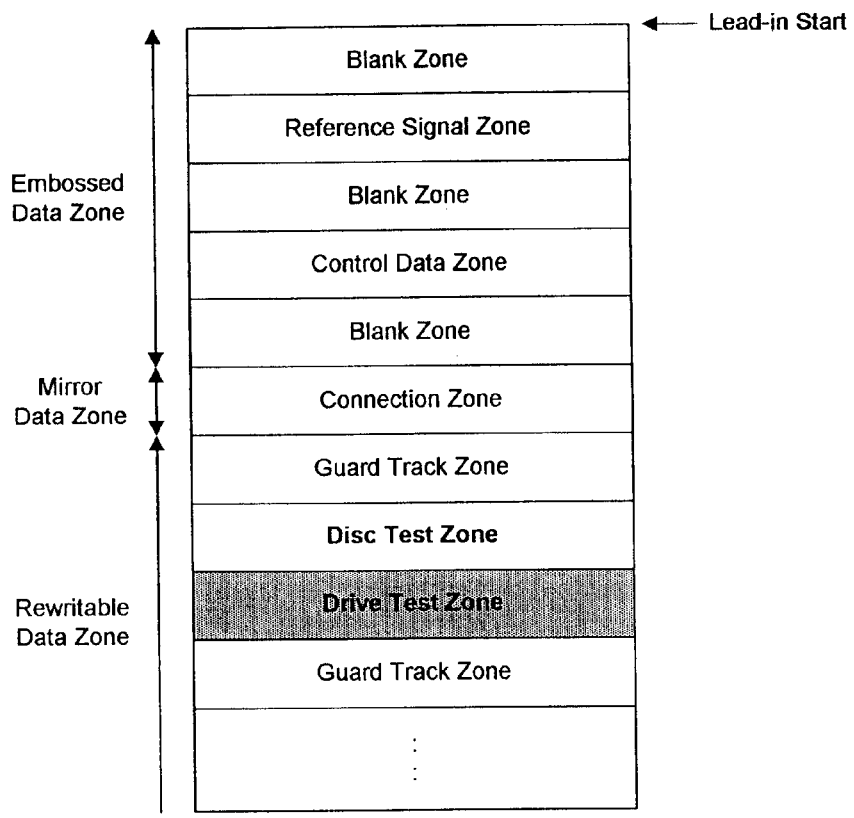
FIG. 5 is a partial view of the lead-in area including the data recording test area for detecting the optical writing power for a DVD.
Figure 6:
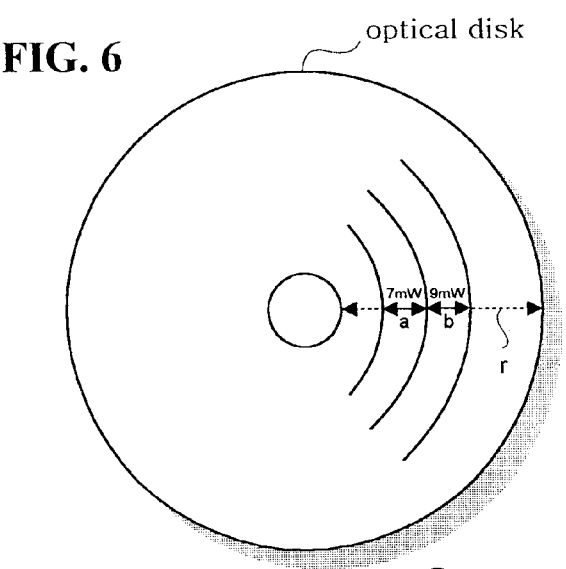
FIG. 6 is a view of an optical disk wherein data is recorded with several different writing powers by conventional data recording methods.

If data recording is initially requested when optimal recording medium 10 is inserted, microcomputer 600 detects an optimal writing power (S22) by following steps S11, S20, and S21, as done in the aforementioned conventional method. The detected optimal writing power is recorded in a predetermined particular area of optical disk 10 as the information indicative of the fact that the procedure for detecting the optimal writing power has been conducted. If optical disk 10 is a write-once CD, the last part of the test area A shown in FIG. 4 is chosen as the particular area. Generally data is recorded on a write-once CD by several trials, and therefore thousands of test data recordings are carried out for recording all of the data. The test data is unlikely to be recorded in the last part of the test area A and the value of the optimal writing power is most likely preserved. This is why the last part of the test area A is chosen as the particular area.

The value of the detected optimal writing power is recorded in a specific interval of the test area A, wherein no data has been recorded previously. In FIG. 4, the interval 90–100 of the test area A has no data, so the value can be recorded in the interval. If optical disk 10 is a rewritable recording medium, various data can be written on the recording medium many times by other recording apparatuses. Hence the value of the optimal writing power is recorded in a special area reserved for that purpose (S23).

Figure 2:
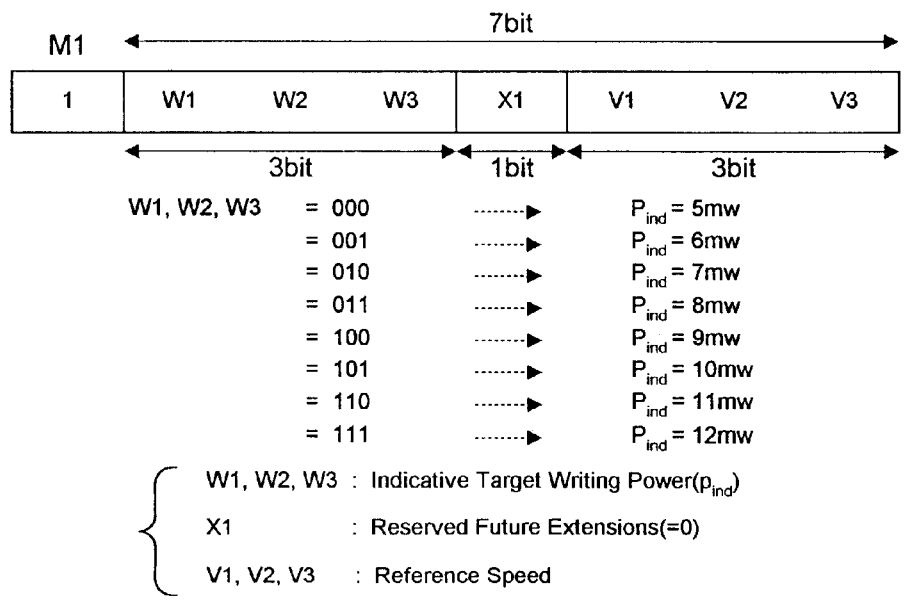
FIG. 2 is an example of the data corresponding to the indicative target writing power recorded on a rewritable optical disk.
Figure 3:
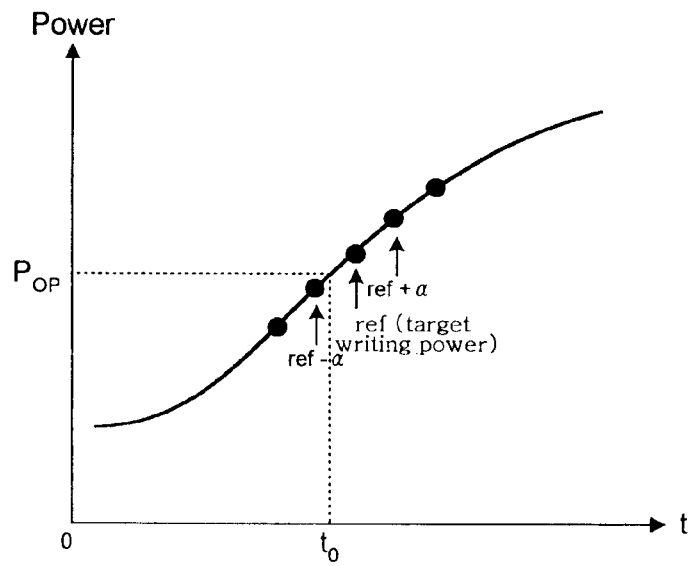
FIG. 3 is an illustrative graph showing the writing power changing within a range with respect to the indicative target writing power to be used when recording test data.

When recording the data corresponding to the detected optimal writing power, an identification code indicative of the fact that the value of the optimal writing power has been recorded and a unique system code of the recording apparatus stored in internal memory 601 can be recorded along with the optimal writing power. For example, if the hexadecimal identification code is $F0F0_{(16)}$ (16-bit data) and the system code is 4 (8-bit data), then the 4-bit data corresponding to the optimal writing power is preceded by $F0F004_{(16)}$ (24-bit data). If the optimal writing power is 7 mW, the 4-bit information on the optimal writing power to be appended to the value of $F0F004_{(16)}$ becomes $0010_{(2)}$. The value of three bits, excluding the most significant bit (MSB) in the 4-bit information on the optimal writing power, is interpreted exactly like the values of W1, W2, and W3 representing the indicative target writing power shown in FIG. 2. In consequence, the hexadecimal data to be recorded on recording medium 10 amounts to $F0F0042_{(16)}$.

Finishing the procedure for detecting and recording the optimal writing power, microcomputer 600 records the digital data received from A/D converter 20 in the program area of recording medium 10 with the obtained optimal writing power (S24).

If another request for recording data on the recording medium is received, microcomputer 600 reads the data recorded in the particular area of optical disk 10 and examines whether the process of detecting the optimal writing power has been performed before. If confirmed, microcomputer 60 examines whether the value of the optimal writing power exists.

To this end, microcomputer 60 retrieves the data preserved in the particular area by controlling pickup 11 using servo unit 110 and driver unit 90 (S31) and examines whether the value of the optimal writing power has been updated by other recording/reproducing apparatuses (S32). The existence of identification code $F0F0_{(16)}$ means that no recording/reproducing apparatus updated the value of the optimal writing power.

Unless the identification code is detected, microcomputer 600 regards the value of the optimal writing power as not preserved on recording medium 10 or meaningless (S40). Thus microcomputer 600 repeats the procedure for detecting and preserving the optimal writing power (S50) and records user data in the program area on recording medium 10 using the obtained optimal writing power (S70).

If identification code $F0F0_{(16)}$ is detected in S32, microcomputer 600 regards the value of the optimal writing power as preserved (S40). If the system code is recorded together with the identification code, microcomputer 600 tests whether the attained system code matches the system code stored in internal memory 601 (S60).

If system code 04 stored in internal memory 601 differs from the detected system code, the 8-bit data following code $F0F0_{(16)}$, microcomputer 600 regards the detected optimal writing power as written by another recording/reproducing apparatus with different optical characteristics. So microcomputer 600 performs the aforementioned procedure for detecting and recording the optimal writing power (S50) and records incoming user data in the program area on optical disk 10 using the newly obtained optimal writing power (S70). If the compared values are same in S60, microcomputer 600 records incoming user data in the program area on optical disk 10 using the detected optimal writing power (S70).

The new optimal writing power obtained when the two compared values are different in S60 can be recorded together with the system code in the corresponding area of the recording medium. Also, instead of storing the system code in internal memory 601 of microcomputer 600, the system code can be set by a hardware dip-switch.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for optimally recording information on an optical recording medium, comprising the steps of:

(a) reading the reference writing power recorded on the optical recording medium;

(b) recording test data on the optical recording medium by changing the writing power within a range with respect to the reference writing power;

(c) reproducing the recorded test data and detecting an optimal writing power from a property of the reproduced signal; and (d) recording the information indicative of whether to carry out said steps (a) through (c) in next data recording operations in a predetermined area of said optical recording medium.

2. A method according to claim 1, wherein said property of the reproduced signal is the jitter characteristic of the reproduced signal.

3. A method according to claim 1, wherein said information recorded in said step (d) is the optimal writing power detected in said step (d).

4. A method according to claim 3, wherein said information recorded in said step (d) further includes a unique code identifying a recording device.

5. A method for optimally recording information on an optical recording medium in a recording device, comprising the steps of:

(a) checking the information recorded in a predetermined area of the optical recording medium; and (b) determining whether to execute a procedure for detecting an optimal writing power based on the checked result.

6. A method according to claim 5, wherein said step (a) comprises:

checking whether information on an optimal writing power exists in the predetermined area; and comparing an identification code of said recording device with a device identifying code retrieved from the optical recording medium, if the information proves to exist.

7. A method according to claim 5, wherein said step (a) compares a device identifying code recorded in the predetermined area of the optical recording medium with an identification code of said recording device.

8. An apparatus for optimally recording information on an optical recording medium, comprising:

detection means for detecting the reference writing power recorded on a predetermined area of the optical recording medium;

recording means for recording test data on the optical recording medium within a range with respect to the reference writing power to obtain an optimal recording condition;

reproducing means for reproducing the recorded test data; and controlling means for controlling said recording means to record information indicative of whether to perform a procedure for obtaining an optimal recording condition in the predetermined area after obtaining the optimal recording condition from the properties of the reproduced signal.

9. An apparatus according to claim 8, wherein said property of the reproduced signal is the jitter characteristic of the reproduced signal.

10. An apparatus according to claim 8, wherein said information recorded in the predetermined area is the optimal writing power obtained in course of obtaining the optimal recording condition.

11. An apparatus according to claim 8, wherein said information recorded in the predetermined area further includes a unique code identifying a recording device.

12. An apparatus for optimally recording information on an optical recording medium, comprising:

a pick-up for detecting the reference writing power recorded on a predetermined area of the optical recording medium, recording test data on the optical recording medium within a range with respect to the reference writing power, and reproducing the recorded test data; and a controller for controlling said pick-up to record information indicative of whether to perform a procedure for obtaining an optimal recording condition in the predetermined area after obtaining the optimal recording condition from the properties of the reproduced signal.

13. An apparatus according to claim 12, wherein said property of the reproduced signal is the jitter characteristic of the reproduced signal.

14. An apparatus according to claim 12, wherein said information recorded in the predetermined area is the optimal writing power obtained in course of obtaining the optimal recording condition.

15. An apparatus according to claim 12, wherein said information recorded in the predetermined area further includes a unique code identifying a recording device.

16. An apparatus for optimally recording information on an optical recording medium, comprising:

a pick-up for reproducing data recorded on the recording medium; and a controller for checking information recorded in a predetermined area of the optical recording medium and determining whether to execute a procedure for obtaining an optimal recording condition based on the checked result.

* * * * *